USO10081369B2

United States Patent
Ando

(10) Patent No.: US 10,081,369 B2
(45) Date of Patent: Sep. 25, 2018

(54) DRIVE SUPPORT APPARATUS

(71) Applicant: DENSO CORPORATION, Kariya, Aichi-pref. (JP)

(72) Inventor: Motonori Ando, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/373,607

(22) Filed: Dec. 9, 2016

(65) Prior Publication Data
US 2017/0166220 A1    Jun. 15, 2017

(30) Foreign Application Priority Data
Dec. 15, 2015 (JP) .................................. 2015-244540

(51) Int. Cl.
```
G06F 19/00      (2018.01)
B60W 50/08      (2012.01)
G01C 21/34      (2006.01)
G01C 21/36      (2006.01)
```
(52) U.S. Cl.
CPC ............. *B60W 50/08* (2013.01); *G01C 21/34* (2013.01); *G01C 21/3655* (2013.01)

(58) Field of Classification Search
USPC ........................................................ 701/117
See application file for complete search history.

(56) References Cited

U.S. PATENT DOCUMENTS

| 8,660,734 B2* | 2/2014 | Zhu ...................... | G05D 1/0214 |
| | | | 701/23 |
| 9,558,659 B1* | 1/2017 | Silver ................... | G08G 1/0125 |
| 9,746,853 B2* | 8/2017 | Scheepjens .......... | G05D 1/0212 |
| 2002/0135467 A1 | 9/2002 | Koike | |
| 2002/0198632 A1* | 12/2002 | Breed .................... | G01S 13/931 |
| | | | 701/1 |
| 2003/0006889 A1 | 1/2003 | Koike | |
| 2003/0009275 A1 | 1/2003 | Koike | |

(Continued)

FOREIGN PATENT DOCUMENTS

| JP | 2000-276696 A | 10/2000 |
| JP | 2005-182308 A | 7/2005 |

(Continued)

*Primary Examiner* — Tyler Paige
(74) *Attorney, Agent, or Firm* — Harness, Dickey & Pierce, P.L.C.

(57) ABSTRACT

A drive support apparatus includes a positioner determining a current position of a subject vehicle, a road determiner determining a currently-traveled road of the subject vehicle by map-matching the current position on a link of a road map, a node determiner determining a first intersection node on the currently-traveled road, a priority determiner determining whether the currently-traveled road is a priority road at the first intersection node against an intersecting road, a drive support controller performing a suppressed drive support control when the priority determiner determines that the currently-traveled road is a priority road, and an area setter setting a determination-kept-unchanged (D-K-U) area based on the intersection node. Based on the above, the drive support apparatus can accurately determine whether a current situation is a drive support suppression situation in which the drive support to a driver should not be provided.

12 Claims, 6 Drawing Sheets

(56) References Cited

U.S. PATENT DOCUMENTS

| | | | |
|---|---|---|---|
| 2012/0083960 A1* | 4/2012 | Zhu | G05D 1/0214 |
| | | | 701/23 |
| 2013/0018572 A1* | 1/2013 | Jang | G08G 1/164 |
| | | | 701/119 |
| 2016/0231746 A1* | 8/2016 | Hazelton | G05D 1/0212 |
| 2017/0166220 A1* | 6/2017 | Ando | G01C 21/3655 |

FOREIGN PATENT DOCUMENTS

| | | |
|---|---|---|
| JP | 2006-182207 A | 7/2006 |
| JP | 2013-134567 A | 7/2013 |

* cited by examiner

DRIVE SUPPORT APPARATUS

CROSS REFERENCE TO RELATED APPLICATION

The present application is based on and claims the benefit of priority of Japanese Patent Application No. 2015-244540, filed on Dec. 15, 2015, the disclosure of which is incorporated herein by reference.

TECHNICAL FIELD

The present disclosure generally relates to a drive support apparatus that supports a drive operation of a driver, or a technique of providing a drive support, in terms of determining whether to suppress the drive support.

BACKGROUND INFORMATION

The drive support apparatus provides a drive support for a driver of a vehicle, with a sophistication of determining whether the drive support is really necessary in a certain situation, i.e., determining whether providing a drive support to a driver really supports the driver or actually bothers him/her.

For example, according to a patent document, Japanese Patent Laid-Open No. 2013-134567 (patent document 1), an in-vehicle camera is used to determine whether a currently-traveled road that is traveled by a subject vehicle is a priority road or a non-priority road, i.e., whether one vehicle on a certain road has a priority of crossing/entering an intersection against the other vehicle that is on an intersecting road, for example. Then, when it is determined that the subject vehicle is on a priority road, the existence of the other vehicle is not reported/notified to a driver of the one vehicle.

When a captured image from the in-vehicle camera is analyzed for a determination of whether or not the subject vehicle is traveling on a priority road, the image analysis has to be "sequentially" performed, or for image by image basis. That means, an image analyzer has to have a high performance Central Processing Unit (CPU) or the like, for handling a high processing load.

Further, the patent document 1 discloses that the determination of whether the subject vehicle is traveling on a priority road is made based on information obtained via a vehicle-to-vehicle communication, or is made based on a vehicle behavior of stopping at/around an intersection. However, a vehicle can obtain information via a vehicle-to-vehicle communication only in a limited area. Further, a stop behavior of a vehicle can tell whether the subject vehicle is traveling on a priority road only in a limited situation.

A travel locus of the subject vehicle may be map-matched to a road shape of a road map, which may be known as a so-called "map matching". Therefore, the map matching technique may be utilized for determining whether the subject vehicle is traveling on a priority road or on a non-priority road. Map matching does not put a very high processing load on a processor, and is applicable to many situations for the determination of a priority road, i.e., for determining whether the subject vehicle is traveling on a priority road.

However, road map information used in the map matching represents an intersection as an intersection node, e.g., as a "point", thereby causing a mis-match, e.g., mis-determination in which a vehicle actually traveling "in" an intersection area is determined as traveling on one of the two links (i.e., two roads) that are connected to a certain intersection node.

Further, a situation may be more complicated at or around an intersection, which may have a few (e.g., two, three, four or more) connected roads, among which a vehicle has to be matched/mapped to only one of the connected roads (i.e., to only one of plural candidate roads). Thus, when the subject vehicle is traveling in an intersection area or around (i.e., at a proximity of) an intersection, the subject vehicle approaching that intersection in reality for a left/right may be falsely determined by the map matching as having already turned at that intersection and traveling on the rightward-extending road or on the leftward-extending road therefrom. As a result, the currently-traveled road on which the subject vehicle is traveling may also be falsely determined as a priority road or as a non-priority road. Based on such a false determination, the drive support for the driver (i.e., for the drive operation) may also be falsely/wrongly provided, i.e., may be provided in an in-accurate/non-suitable manner. That is, when a priority/non-priority road determination is wrong, whether to suppress the drive support or not is determined in an in-accurate manner.

SUMMARY

It is an object of the present disclosure to provide a drive support apparatus that is capable of accurately determining whether to suppress a drive support or not depending on a travel situation of a vehicle.

The above-described object of the present disclosure is achieved by features recited in an independent claim, and other advantageous features are recited in dependent claims.

The numerals parenthesized in the claims associate the claim element to concrete components in the embodiment, in a non-limiting manner, i.e., in an example-showing manner.

In an aspect of the present disclosure, a drive support apparatus that is disposed in a subject vehicle and performs a drive support control for supporting a drive operation of a driver in the subject vehicle includes a controller. The controller is configured to include a subject vehicle positioner sequentially determining a current position of the subject vehicle having the drive support apparatus by receiving a navigation signal from a navigation satellite of a satellite navigation system and obtaining current position information from the received navigation signal, a road determiner sequentially determining a currently-traveled road that is currently traveled by the subject vehicle, based on a matching result of a map matching that places (i) the current position of the subject vehicle determined by the subject vehicle positioner on (ii) one road link in a road map that represents (a) each road by using a link, and (b) each intersection by using an intersection node, a node determiner sequentially determining a first intersection node on the currently-traveled road determined by the road determiner, the first intersection node first encountered by the subject vehicle in a travel direction from the current position of the subject vehicle, a priority determiner sequentially determining whether the currently-traveled road determined by the road determiner is, against an intersecting road, a priority road at the first intersection node determined by the node determiner, a drive support controller performing a suppressed drive support control, when the priority determiner determines that the currently-traveled road is a priority road, the suppressed drive support control being suppressed from a normal drive support control that is performed when the priority determiner determines that the currently-traveled road is a non-priority road, and an area setter setting a determination-kept-unchanged (D-K-U) area based on the intersection node determined by the node determiner. The priority determiner keeps the determination of the priority road unchanged from a determination result made before the subject vehicle enters the D-K-U area, upon determining that the current position of the subject vehicle is inside the D-K-U area.

According to the present disclosure, the determination result of whether to provide a drive support or not is kept unchanged from the one that is made before the entrance of the current position of the subject vehicle into the intersection area, when, i.e., while, the current position of the subject vehicle is inside of the determination-kept-unchanged area (i.e., the D-K-U area). In such manner, even when the subject vehicle is traveling in an intersection area or is traveling around an intersection which tends to be map-matched to a wrong road, the current position of the subject vehicle is accurately map-matched to a true road, i.e., the priority road determiner is prevented from making a false determination result about which road is a priority road. Further, based on a prevention of making a false determination result by the priority road determiner, the drive support controller is enabled to accurately determine a situation as to whether a driver support should be suppressed or not.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
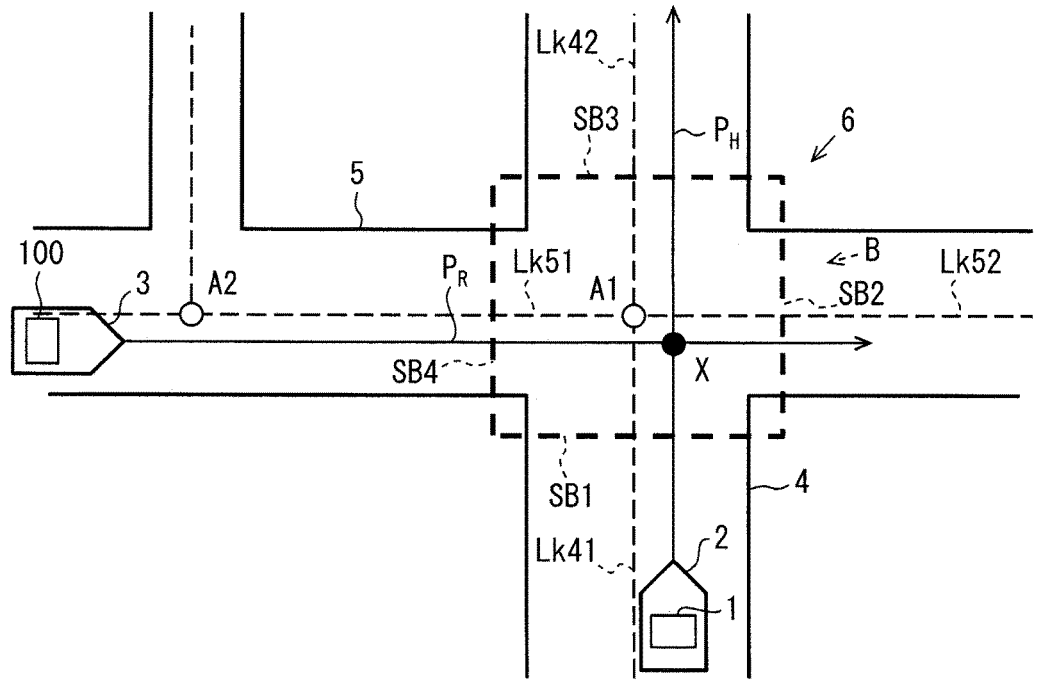
FIG. 1 is an illustration of a situation in which vehicles (2, 3) having a drive support system (1 or 2) are traveling.

Hereafter, the embodiment of the present disclosure is described based on the drawing. As shown in FIG. 1, a vehicle (henceforth, a self-vehicle or subject vehicle) 2 carrying a drive support system 1 travels on a road 4. In a state shown in FIG. 1, another vehicle (henceforth, a nearby vehicle) 3 exists at a proximity of the subject vehicle 2.

The nearby vehicle 3 travels on a crossing road 5 that crosses the road 4 towards an intersection 6 of the two roads 4 and 5. Note that an example of FIG. 1 shows a situation of a right-side traffic in a country like USA, etc., for describing how the drive support system 1 is used. Also, a numeral 100 in the vehicle 3 indicates the same drive support system as the drive support system 1, for the distinction of the two systems in the different vehicles.

[Configuration of the Drive Support System 1]

Figure 2:
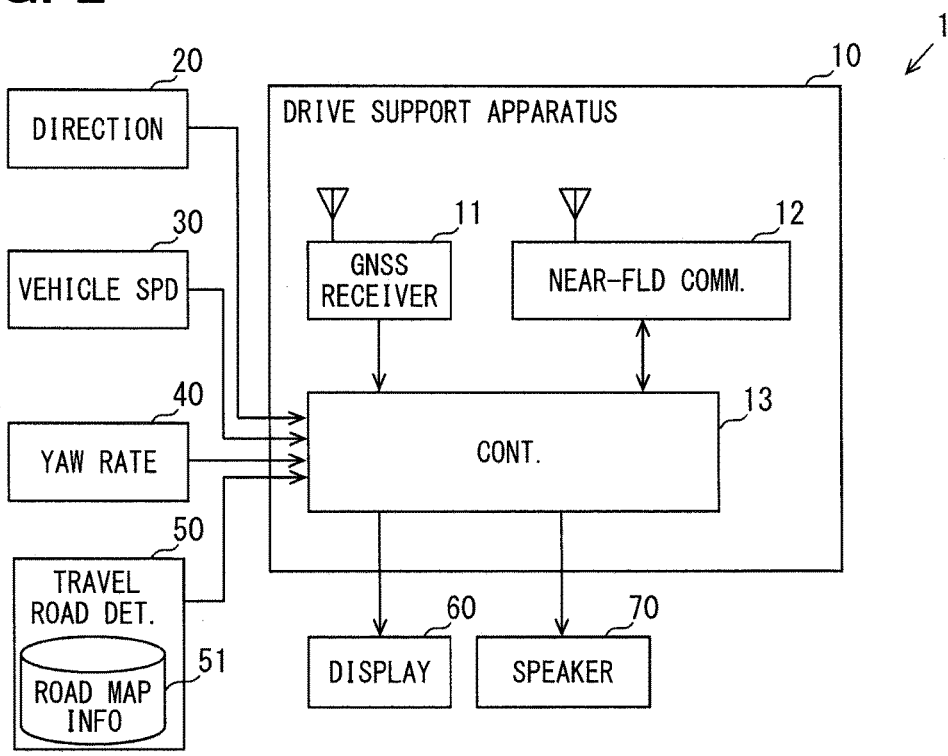
FIG. 2 is a block diagram of the driver support system (1)

As shown in FIG. 2, the drive support system 1 is provided with a drive support apparatus 10, a direction sensor 20, a speed sensor 30, a yaw rate sensor 40, a travel road determiner 50, a display 60, and a speaker 70.

The drive support apparatus 10 is provided with a GNSS receiver 11, a near-field communicator 12, and a controller 13.

The GNSS receiver 11 receives a navigation signal transmitted from the navigation satellites of a Global Navigation Satellite System (GNSS), and sequentially computes a current position based on the received navigation signal.

The near-field communicator 12 is a communication device for performing the vehicle-to-vehicle communication and communication between a roadside device and a vehicle, and performs such communication by using an electric wave of the predetermined frequency bands, e.g., 5.9 GHz bands and 700 MHz bands, to the roadside devices and to the other near-field communicators 12 in other vehicles.

Figure 3:
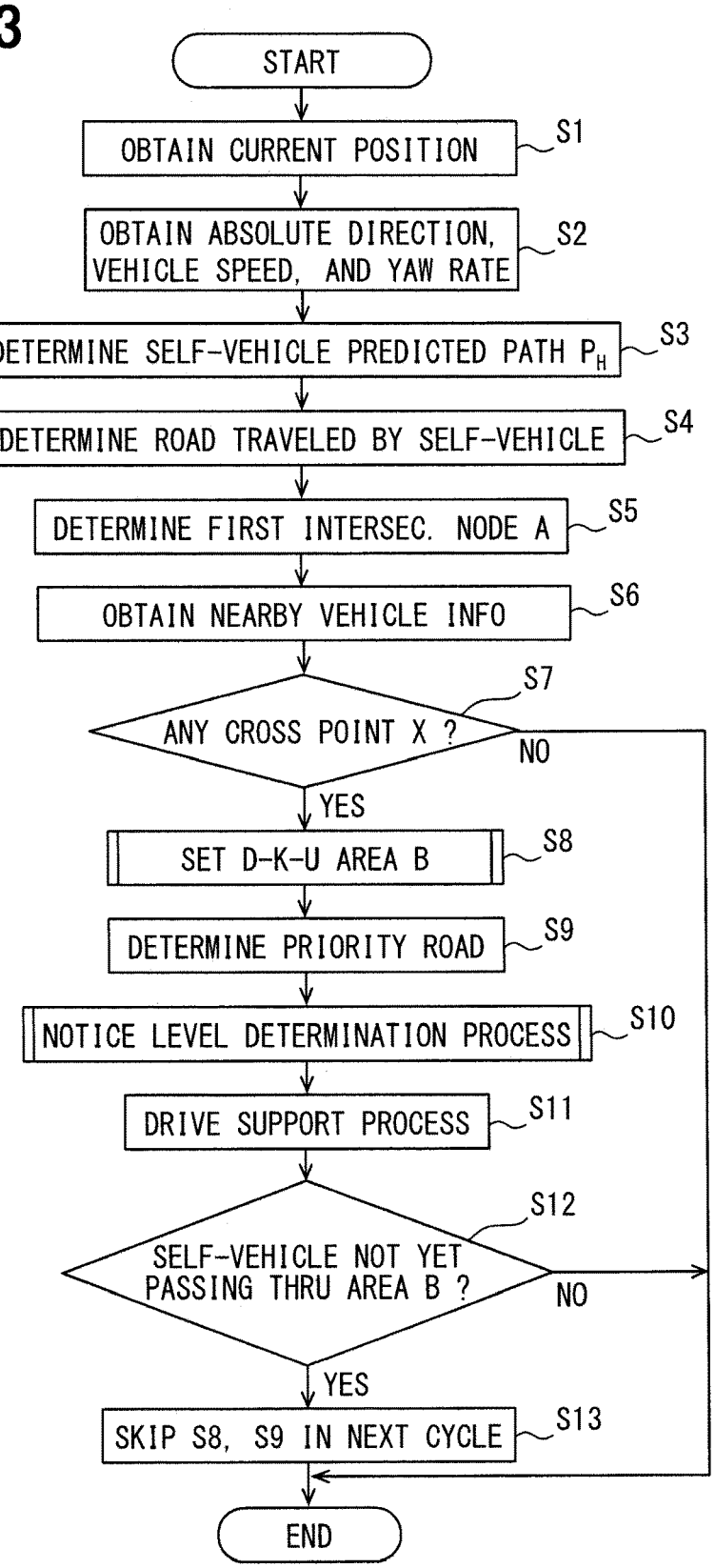
FIG. 3 is a flowchart of a process that is performed by a controller of FIG. 2.

The controller 13 is a computer provided with Central Processing Unit (CPU), Read-Only Memory (ROM), Random-Access Memory (RAM), etc., and the CPU in the controller 13 performs a process shown in FIG. 3 by executing a program that is stored in the ROM or the like, i.e., a non-transitory tangible record medium with a help of a temporary storage function of the ROM. Further, the execution of the program as shown in FIG. 3 enables a programmed method to be performed according to the executed program.

The controller 13 sequentially transmits subject vehicle information from the near-field communicator 12 to the nearby field of the subject vehicle 2, besides performing a process of FIG. 3.

The subject vehicle information of the subject vehicle 2 is information including an accelerator opening degree, an ON-OFF state of the brake, a vehicle speed, and a subject vehicle predicted path $P_H$ regarding the subject vehicle 2.

The controller 13 is connected to a non-illustrated Local Area Network (LAN) in the subject vehicle 2, and obtains the accelerator opening degree and the ON-OFF state of the brake among other items of the subject vehicle information via the in-vehicle LAN.

The direction sensor 20 is a sensor for detecting an absolute direction of the subject vehicle 2, for example, and may be implemented as a geomagnetism sensor.

The speed sensor 30 sequentially detects a vehicle speed of the subject vehicle 2.

The yaw rate sensor 40 detects a yaw rate, that is, a rate of rotation (i.e., a rotational angular velocity) around a vertical axis of the subject vehicle 2 which passes through the sensor 40 itself.

The travel road determiner 50 is provided with a memory 51 that memorizes road map information and a current position detector (not illustrated) that sequentially identifies a road that is traveled by the subject vehicle 2.

The road map information memorized by the memory 51 represents a road by using node information and link information.

The node information is information about a node, and a node represents a nodal point or the like for representing (i.e., drawing) a road etc. on a map, for example. The node may represent an intersection of two or more roads. Hereafter, a node representing an intersection is designated as an intersection node.

The link information is information about a link that connects a node on one end of the link with another node on the other end of the link. The link information includes information about a connecting angle. The connecting angle is an angle of the link relative to a reference line that passes through a node to which the link is connected. Further, lane number information may also be included in some of the link information for certain roads, representing the number of lanes for such roads. Further, road class information may also be included in some of the link information, which represents a class of a certain road based on a classification that classifies/categorizes roads into plural road classes in the road map information.

For sequentially identifying a road that is currently traveled by the subject vehicle 2, the travel road determiner 50 performs the map matching that matches the travel locus of the subject vehicle 2, i.e., a polygonal line formed by a series of the current positions of the subject vehicle 2, with a road shape of a road represented by the road map information.

The display 60 is arranged at a position which is visible/viewable from the driver's seat of the subject vehicle 2, and displays the information for supporting the driver's operation of the vehicle, i.e., for providing the drive support for the driver, such as a warning for a nearby vehicle and the like. The speaker 70 outputs various kinds of sound to a compartment of the subject vehicle 2.

[Process Performed by the Controller 13]

The controller 13 performs a process shown in FIG. 3 periodically or intermittently.

In Step S1 (hereafter "Step" may be omitted), the current position of the subject vehicle 2 is obtained from the GNSS receiver 11. The current position of the subject vehicle 2 is represented by using latitude, longitude, and altitude. Since the controller 13 can determine the current position of the subject vehicle 2 by the process of S1, S1 is equivalent to a subject vehicle positioner in the claims.

In S2, the absolute direction of the subject vehicle 2, the vehicle speed, and the yaw rate are obtained. Each of the absolute direction, the vehicle speed and the yaw rate may respectively be obtained from the direction sensor 20, the speed sensor 30, and the yaw rate sensor 40.

In S3, a subject vehicle predicted path $P_H$ is determined. The subject vehicle predicted path $P_H$ is a prediction of a travel path of the subject vehicle 2 in the future. The subject vehicle predicted path $P_H$ in the present embodiment is a straight line extending in the absolute direction obtained in S2 which starts from the current position obtained in S1.

Since the straight line of the subject vehicle predicted path $P_H$ extends in the absolute direction obtained in S2, the subject vehicle predicted path $P_H$ in the present embodiment uses the absolute direction obtained in S2 as a travel direction of the subject vehicle 2.

In S4, information about the currently-traveled road which is traveled by the subject vehicle 2 is obtained from the travel road determiner 50. Step S4 is equivalent to a road determiner in the claims.

The road map information near, i.e., at the proximity of, the subject vehicle 2 is obtained from the travel road determiner 50 based on the current position of the subject vehicle 2 obtained in S1, and the obtained road map information is temporarily memorized to a memory of the controller 13, e.g., to the RAM, which is not illustrated.

In S5, an intersection node A is determined as a first, i.e., the closest, intersection node in a forward direction on the road currently traveled by the subject vehicle 2, based on (i) the road determined in S4 as being traveled by the subject vehicle 2, (ii) the road map information obtained in S4, and (iii) the subject vehicle predicted path $P_H$ determined in S3. Step S5 is equivalent to a node determiner in the claims.

In FIG. 1, an intersection node A1 and an intersection node A2 are shown. Note that an intersection node "A" indicates an intersection in concept, i.e., not a concrete/practical one in the illustration. In a state illustrated in FIG. 1, the subject vehicle 2 is traveling on the road 4. Therefore, in the state of FIG. 1, the intersection node A1 is determined as the first intersection node A.

In S6, nearby vehicle information is obtained from the near-field communicator 12. As mentioned above, the subject vehicle 2 sequentially transmits the subject vehicle information from the near-field communicator 12. The drive support system 100 disposed in the nearby vehicle 3 is provided with the same configuration as the drive support system 1 disposed in the subject vehicle 2. Therefore, the drive support system 100 disposed in the nearby vehicle 3 also sequentially transmits the same kind of information as the subject vehicle information.

The information transmitted from the drive support system 100 is considered as the nearby vehicle information by the drive support system 1. When the nearby vehicle 3 exists within a communication range of the near-field communicator 12 of the subject vehicle 2, the near-field communicator 12 can receive the nearby vehicle information transmitted from the drive support system 100. When the near-field communicator 12 can receive the nearby vehicle information, the nearby vehicle information can be obtained in S5.

The nearby vehicle information is information including the accelerator opening degree, the ON-OFF state of the brake, the vehicle speed, and nearby vehicle predicted path $P_R$ regarding the nearby vehicle 3.

In S7, it is determined whether any cross point X exists, i.e., is found, between the subject vehicle predicted path $P_H$ determined in S3 and the nearby vehicle predicted path $P_R$ included in the nearby vehicle information that is obtained in S6. When it is determined that there is no cross point X between the two paths, the process shown in FIG. 3 ends. On the other hand, when it is determined that a cross point X exists, the process proceeds to S8.

Figure 4:
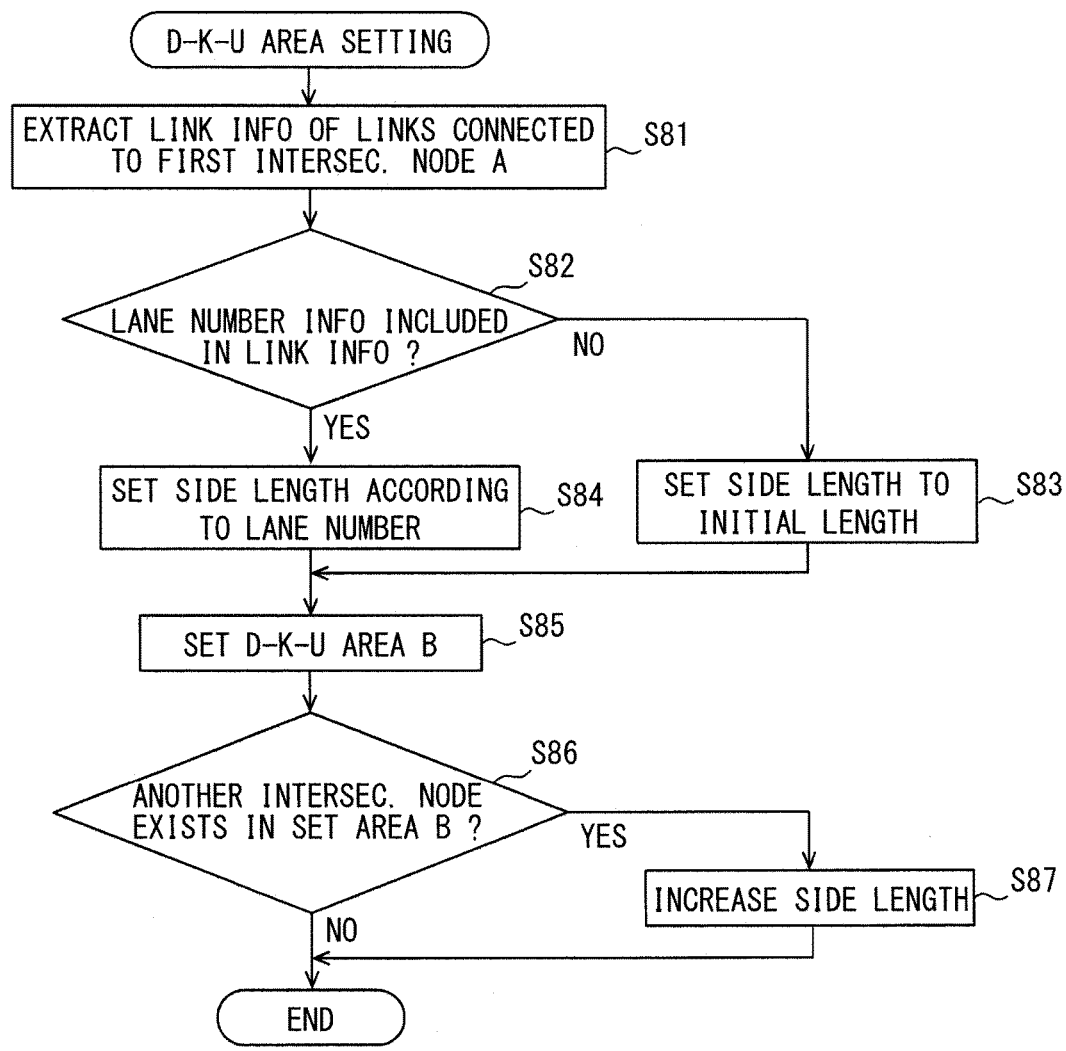
FIG. 4 is a flowchart of a detailed process in one step of the flowchart in FIG. 3.

In S8, a determination-kept-unchanged (D-K-U) area B is set. Here, the determination that is kept unchanged within area B is a determination regarding which road has a priority over the another road, as will be explained in more detail below regarding S9. The determination-kept-unchanged area B in the present embodiment is a square shape area that centers on the first intersection node A determined in S5, as shown in FIG. 1. A process for setting up the determination-kept-unchanged area B is shown in FIG. 4 in details. Steps S81-S85 of FIG. 4 and Steps S12 and S13 mentioned later are equivalent to an area setter in the claims.

In S81 of FIG. 4, the link information about each of the links connected to the first intersection node A that is determined in S5 is extracted from the road map information obtained in S4. In the example of FIG. 1, the link information about links Lk41, Lk42, Lk51, and Lk52 is extracted.

In S82, it is determined whether the link information extracted in S81 includes the lane number information representing the number of lanes. Even when at least one of plural pieces of the link information includes the lane number information, Step S82 is determined as YES. When none of the plural pieces of the link information includes the lane number information, Step S82 is determined as NO.

When the determination of S82 is NO, the process proceeds to S83.

In S83, a side length of each of four sides, for example, of the D-K-U area B is set to an initial length of a preset value. The initial length may be, for example, set to a value that makes the area B to cover an average-sized intersection, i.e., that defines a square shape area B that is slightly larger than an average-sized intersection.

When the determination of S82 is YES, the process proceeds to S84.

In S84, a side length of each of the four sides of the D-K-U area B is set according to the number of lanes that are represented by the lane number information in the link information of a corresponding link.

As shown in FIG. 1, the determination-kept-unchanged area B has four sides SB1, SB2, SB3, and SB4, and the side SB1 corresponds to the link Lk41, the side SB2 corresponds to the link Lk52, the side SB3 corresponds to the link Lk42, and the side SB4 corresponds to the link Lk51. More specifically, the relationship between the number of lanes and the length of the side of the determination-kept-unchanged area B may be represented as "the number of lanes×coefficient+constant" ("×" depicting multiplication, and "+" depicting addition).

Thus, by increasing the length of the side of the determination-kept-unchanged area B as the number of lanes increases in a link, an undesired situation is prevented, in which an intersection area partially spreads/extends out from the determination-kept-unchanged area B. For the side having no lane number information in the link information of the corresponding link, the initial length is set as mentioned above.

In S85, each of the four sides of the determination-kept-unchanged area B whose length has been determined in S83 or S84 is arranged to be orthogonal to the connecting angle of the each link. In other words, each of the four sides of the D-K-U area B is arranged to be perpendicular to each of the links. Note that the connecting angle of each link is included in the link information. Further, the four sides are arranged to make a closed area. That is, the determination-kept-unchanged area B is defined to have a shape and a size as a closed area with each of the four sides perpendicular to each of the four links. Thus, when the two intersecting roads intersect are not at a right angle, the corresponding D-K-U area B has a non-rectangular shape (i.e., has a parallelogram shape).

Then, the shape-and-size-determined determination-kept-unchanged area B is set up at, i.e., is arranged or put on, the first intersection node A that is determined in S5. The determination-kept-unchanged area B set up in the above-described manner has a size that is slightly, or somewhat, larger than the intersection, i.e., is an area that includes the subject intersection and its proximity.

Steps S86 and S87 are equivalent to an area expander in the claims.

In S86, it is determined whether another intersection node exists in the determination-kept-unchanged area B set up in S85. Another intersection node is an intersection node other than the intersection node A determined in S5.

In the example of FIG. 1, there is no other intersection node A existing in the determination-kept-unchanged area B. Therefore, the determination of S86 is NO. When the determination of S86 is NO, the process of FIG. 4 ends as it is, i.e., without any further process. Therefore, the determination-kept-unchanged area B set up in S85 is not changed.

On the other hand, when the determination of S86 is YES, the process proceeds to S87.

In S87, the length of the side of the determination-kept-unchanged area B set up in S85 is increased according to the number of other intersection nodes in the determination-kept-unchanged area B set up in S85. The process of S87 is more practically described with reference to FIG. 5.

Figure 5:
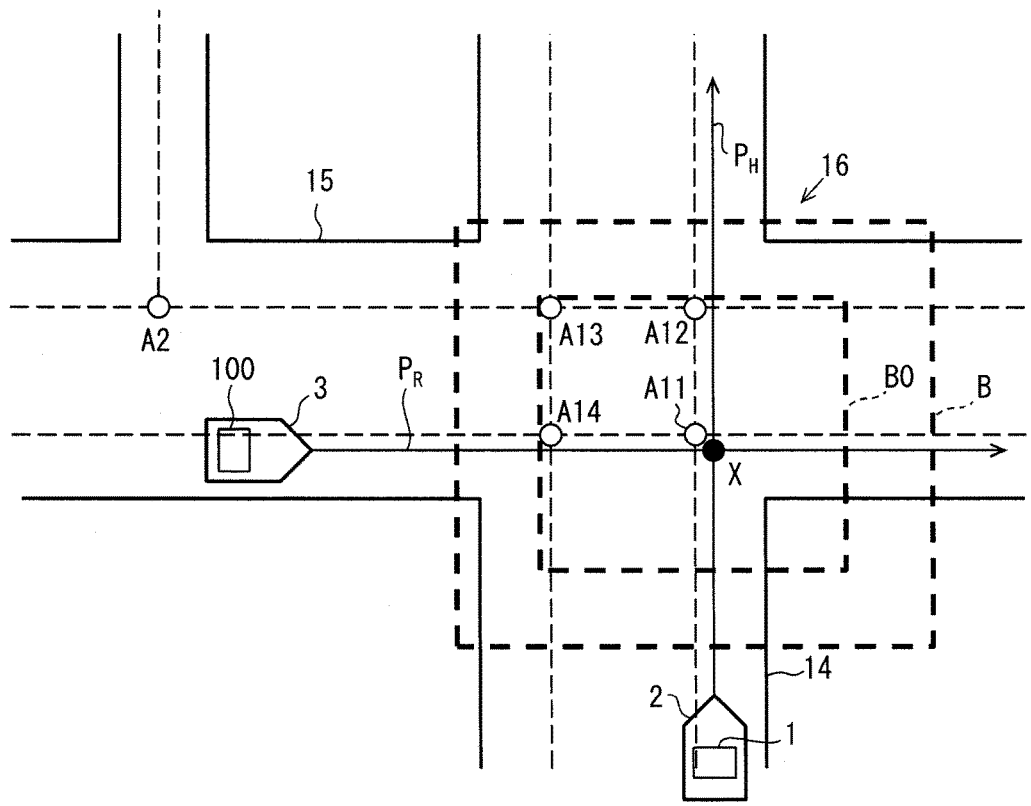
FIG. 5 is an illustration of how a determination-kept-unchanged (D-K-U) area is set by a process of one step in the flowchart of FIG. 4.

In FIG. 5, the subject vehicle 2 travels on a road 14 toward an intersection 16, and the nearby vehicle 3 travels on a road 15 toward an intersection 16. Both of the roads 14 and 15 are a wide-width road having a large width, and the intersection 16 is represented by four intersection nodes A, i.e., by intersection nodes A11, A12, A13, and A14.

In the example of the FIG. 5, the first intersection node A determined in S5 is the intersection node A11, and an area B0 is the determination-kept-unchanged area determined by the process of S83 or S84. For clear distinction from a finally-determined D-K-U area B, the area is designated as the area B0 (zero). The determination-kept-unchanged area B0 is centered on the intersection node A11.

In the determination-kept-unchanged area B0, three other intersection nodes A12, A13, and A14 are included in addition to the intersection node A11. These three intersection nodes A12, A13, and A14 respectively serve as another intersection node.

Since another intersection node exists in the determination-kept-unchanged area B0, the determination of S86 is YES, and the process proceeds to S87.

In S87, the length of each side of the determination-kept-unchanged area B0 set up in S85 is increased according to the number of the other intersection nodes.

For example, the length of one side set in S85 may be increased by adding a product of multiplication of (i) a preset unit addition length and (ii) the number of lanes, for having a final side length of the D-K-U area B, for each of the four sides.

Description Returns to FIG. 3.

In S9, a priority road is determined. Step S9 is equivalent to a priority determiner in the claims.

The determination of a priority road is a process in which two roads are compared with each other. That is, a subject road that is currently traveled by the subject vehicle 2 is compared with a comparison road that is connected to the currently-traveled road at the first, i.e., closest, intersection node determined in S5, and one of the two roads is determined as having priority over the other.

The priority road may be determined in various methods that are well-known in the art.

For example, the priority road determination is performed by using the number of lanes and the road class. When the currently-traveled road traveled by the subject vehicle 2 belongs to a different road class from a road class of the comparison road, a road belonging to a higher road class is determined as a priority road.

When two roads belong to the same road class, the one having the greater number of lanes is determined as a priority road.

When two roads belong to the same road class and have the same number of lanes, or when road widths are available, i.e., comparable with each other, for the two roads but no lane number information is included in the link information, one of the two roads may be determined as a priority road based on the road width. Further, when none of the above comparisons is possible, the two roads may both be determined as non-priority roads.

Figure 6:
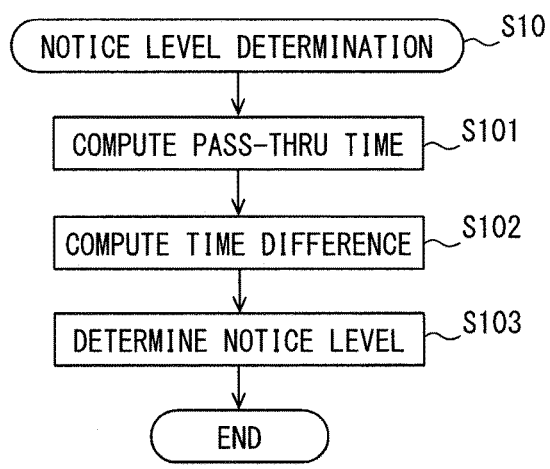
FIG. 6 is a flowchart of a detailed process in one step of the flowchart in FIG. 3.

In S10, a notice level determination process is performed. Regarding the notice level determination process, the detailed process shown in FIG. 6 is performed.

In S101, a required pass-through time is computed for the subject vehicle 2 and for the nearby vehicle 3. That is, a time required for the subject vehicle 2 to pass through the cross point X and a time required for the nearby vehicle 3 to pass through the cross point X are respectively computed. For computation of the required pass-through time of the subject vehicle 2, a distance of the current position of the subject vehicle 2 from the cross point X is first computed based on the current position of the subject vehicle 2, and the coordinates of the cross point X. The computed distance is divided by the current vehicle speed of the subject vehicle 2, for the computation of the required pass-through time of the subject vehicle 2. The required pass-through time of the nearby vehicle 3 is computed in the same manner as the required pass-through time of the subject vehicle 2.

In S102, a time difference between the two required pass-through times computed in S101 is computed.

In S103, a notice level is determined based on the time difference computed in S102.

When the time difference is equal to or less than a first threshold TH1, the notice level is set to a level Lv3.

When the time difference is greater than the first threshold TH1 and is equal to or less than a second threshold TH2, the notice level is set to a level Lv2.

When the time difference is greater than the second threshold TH2, a notice level is set to a level Lv1. Note that a value of the threshold TH1 is smaller than a value of the threshold TH2 (TH1<TH2). These thresholds TH1, TH2 are values for a determination of whether the subject vehicle 2 and the nearby vehicle 3 respectively passing through the same cross point X may collide with each other. The threshold TH1 may, for example, be set to a value of several seconds.

After performing S103, the process of FIG. 6 ends, and proceeds to S11 of FIG. 3. Step S11 is equivalent to a drive support controller in the claims, and performs a drive support process based on the notice level determined in S10 and the result of the priority road determination in S9.

More practically, when the road currently traveled by the subject vehicle 2 is determined as a priority road in S9, no drive support is provided (i.e., drive support is suppressed) regardless of the notice level determined in S10. Providing no drive support is one form of suppression of the drive support. Note that the drive support in the present embodiment is provided as a notice support that reminds the driver in the subject vehicle 2 of the existence of the nearby vehicle 3, by using the display 60 or by using both of the display 60 and the speaker 70.

When (i) the currently-traveled road by the subject vehicle 2 is determined as a non-priority road in S9 and (ii) the notice level determined in S10 is the level Lv1, no drive support is provided for the driver.

When (i) the currently-traveled road by the subject vehicle 2 is determined as a non-priority road, and (ii) the notice level is the level Lv2, a notice is provided for the driver only from the display 60 for drawing a driver's attention to the nearby vehicle 3.

When (i) the currently-traveled road by the subject vehicle 2 is determined as a non-priority road and (ii) the notice level is the level Lv3, a warning about the nearby vehicle 3 is provided for the driver in a visual form from the display 60 and in an audible form from the speaker 70. The levels Lv1 to Lv3 and/or the drive support provided in each of those levels may vary, i.e., may be changed from the above-described contents.

In S12, it is determined whether the current position of the subject vehicle 2 has not yet passed through the determination-kept-unchanged area B determined in S8.

When (A) the current position of the subject vehicle 2 is within the determination-kept-unchanged area B, or (B) the current position of the subject vehicle 2 has not entered into the determination-kept-unchanged area B, the determination of S12 branches to YES. Note that the current position of the subject vehicle 2 is set to the position that is obtained in S1. Alternatively, in consideration of the size of the subject vehicle 2, the position of the subject vehicle 2 obtained in S1 may be moved/shifted backward by several meters along the travel direction of the subject vehicle 2.

When the determination of S12 is YES, the process proceeds to S13.

In S13, it is determined that the process of S8 and S9 will be skipped in the next cycle of the process. In such manner, the result of determination made in S9 regarding the priority road is kept unchanged until the subject vehicle passes through the determination-kept-unchanged area B.

Also, when Step S13 is performed, the process of FIG. 3 ends.

The process of FIG. 3 ends without performing the process of S13, when the determination of S12 is NO.

After ending the process of FIG. 3, the process of FIG. 3 starts from Step S1 in the next cycle. At such time, Steps S8 and S9 are respectively performed, thereby setting a new determination-kept-unchanged area B at a position including the first intersection node A, in case that the cross point X exists after the subject vehicle 2 passes through the determination-kept-unchanged area B.

EXAMPLE

For example, in the state of FIG. 1, the determination-kept-unchanged area B is set at a position shown in FIG. 1 in a process of Step S8 in FIG. 3.

When the road 4 currently traveled by the subject vehicle 2 is compared with the road 5 currently traveled by the nearby vehicle 3, the road 4 traveled by the subject vehicle 2 is wider.

Therefore, such a situation is assumed in the following manner. That is, the driver of the subject vehicle 2 has recognized that the road 4 that is currently traveled by the subject vehicle 2 is a priority road, and the priority road determination in S9 has determined that the road 4 currently traveled by the subject vehicle 2 is a priority road.

Figure 7:
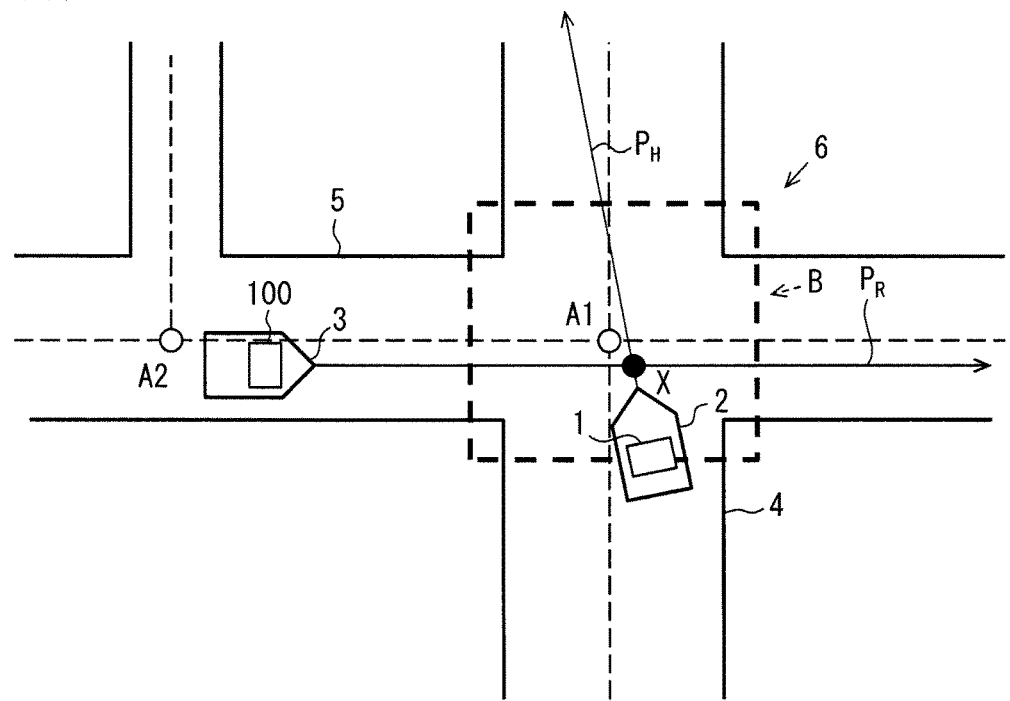
FIG. 7 is an illustration of how a priority road determination is performed in a first embodiment of the present disclosure.

Then, the situation is further assumed that the subject vehicle 2 has entered into the intersection 6, and a state of FIG. 7 is realized.

In the state of FIG. 7, the subject vehicle 2 is in a course of performing a left turn at the intersection 6. In such state, the driver of the subject vehicle 2 is supposed to recognize that the subject vehicle 2 is traveling on a priority road, in general.

However, the accuracy of the map matching falls while changing the travel direction at the intersection 6, the result of map matching may wrongly determine that the currently-traveled road by the subject vehicle 2 is the road 5 that is a non-priority road.

In case that the currently-traveled road by the subject vehicle 2 is determined as the road 5, the state of FIG. 7 leads to the notice level of Lv3 (i) due to the existence of the cross point X and (ii) when the time difference computed in S102 is equal to or less than the first threshold TH1, which means that a warning about the nearby vehicle 3 is provided for the driver. That is, it may be annoying for the driver of the subject vehicle 2 to have such a warning from the drive support apparatus 10 when the subject vehicle 2 is traveling on a priority road.

On the other hand, in the present embodiment, since the determination of S12 branches to YES when the subject vehicle 2 is within the determination-kept-unchanged area B that has been set up before the entrance of the subject vehicle 2 into the intersection 6 as shown in FIG. 7, the result of the priority road determination made before the entrance of the subject vehicle 2 into the intersection 6 is maintained, i.e., is kept unchanged. Therefore, no notice is provided in the drive support process of S11. That is, an unnecessary drive support is suppressed, and annoyance of the driver in the subject vehicle 2 caused by such an unnecessary drive support is prevented.

Figure 8:
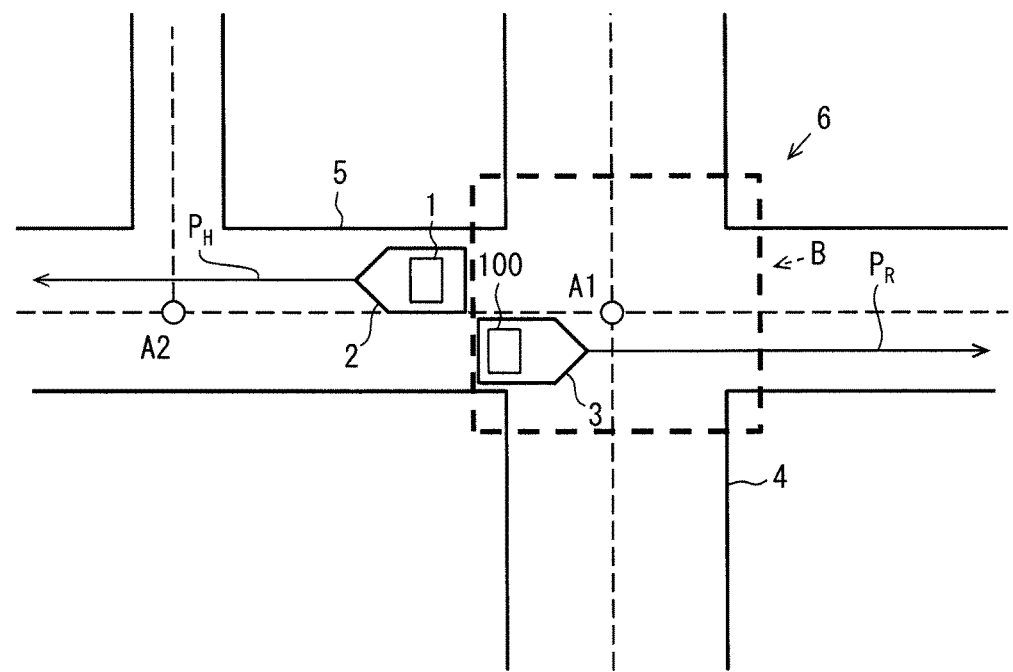
FIG. 8 is an illustration of a situation in which a subject vehicle and a proximate vehicle have both traveled a bit after a situation of FIG. 6.

The determination of S12 branches to YES when the subject vehicle 2 travels, i.e., proceeds, from the position of FIG. 7 to pass through the determination-kept-unchanged area B as show in FIG. 8. Therefore, the process returns to S1. Thereby, the first intersection node A is changed to the intersection node A2 in FIG. 8.

When the first intersection node A is changed to the intersection node A2 of FIG. 8, a new determination-kept-unchanged area B centered on the intersection node A2 is set up.

Note that, in case that the road 4 traveled by the subject vehicle 2 is a non-priority road in the example of FIG. 7, up until the passing through of the determination-kept-unchanged area B by the subject vehicle 2, the drive support is provided for the driver based on an assumption that the road 4 traveled by the subject vehicle 2 is a non-priority road.

Therefore, a too-early notice-loss situation is prevented, in which a notice about the existence of the nearby vehicle 3 is kept unchanged from a providing mode, which may otherwise be stopped before passing through the determination-kept-unchanged area B by the subject vehicle 2.

Summary of the First Embodiment

As mentioned above, in the above-described embodiment, when the current position of the subject vehicle 2 is within the determination-kept-unchanged area B, since the determination of S12 branches to YES, the determination result made before the current position of the subject vehicle 2 enters into the determination-kept-unchanged area B is maintained, i.e., is kept unchanged.

Further, the determination-kept-unchanged area B is an area including the intersection and its neighborhood/proximity. Therefore, even when the current position of the subject vehicle 2 is within or around an intersection, which may often be wrongly matched by map matching to a different road, a determination result about a priority road is prevented from going wrong. Thus, based on a prevention of the wrong determination result about a priority road, an accurate determination about whether the drive support should be provided for the driver is enabled in the drive support process in S11 of FIG. 3 based on the priority road determination result.

Second Embodiment

Next, the second embodiment of the present disclosure is described.

In the description below about the second embodiment, the same numeral represents the same component as already described one, unless otherwise indicated. The configuration may be partially described with the rest of such configuration left to the already-described contents.

Figure 9:
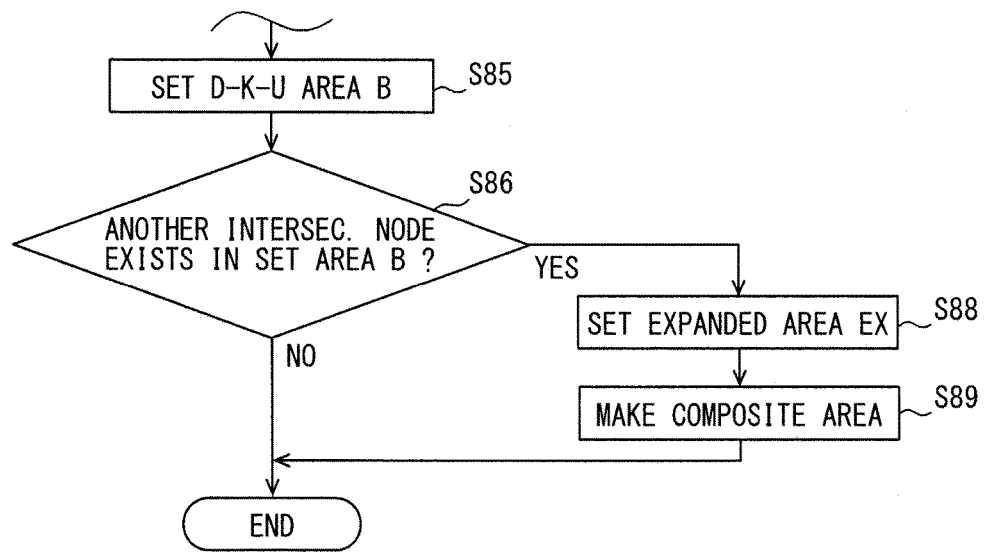
FIG. 9 is a flowchart of a detailed process that replaces a process in FIG. 4 in a second embodiment of the present disclosure.

According to the second embodiment, as shown in FIGS. 9, S88 and S89 replacing S87 of FIG. 4 are performed. In the second embodiment, S86, S88, and S89 are equivalent to an area expander in the claims.

In S88, an expanded area EX is set up based on another intersection node. The expanded area EX is an area having a preset scope for another intersection node and centering on another intersection node.

In the present embodiment, the expanded area EX is an area of a preset square shape with the side length defined roughly as a half of the initial length used in S83.

Figure 10:
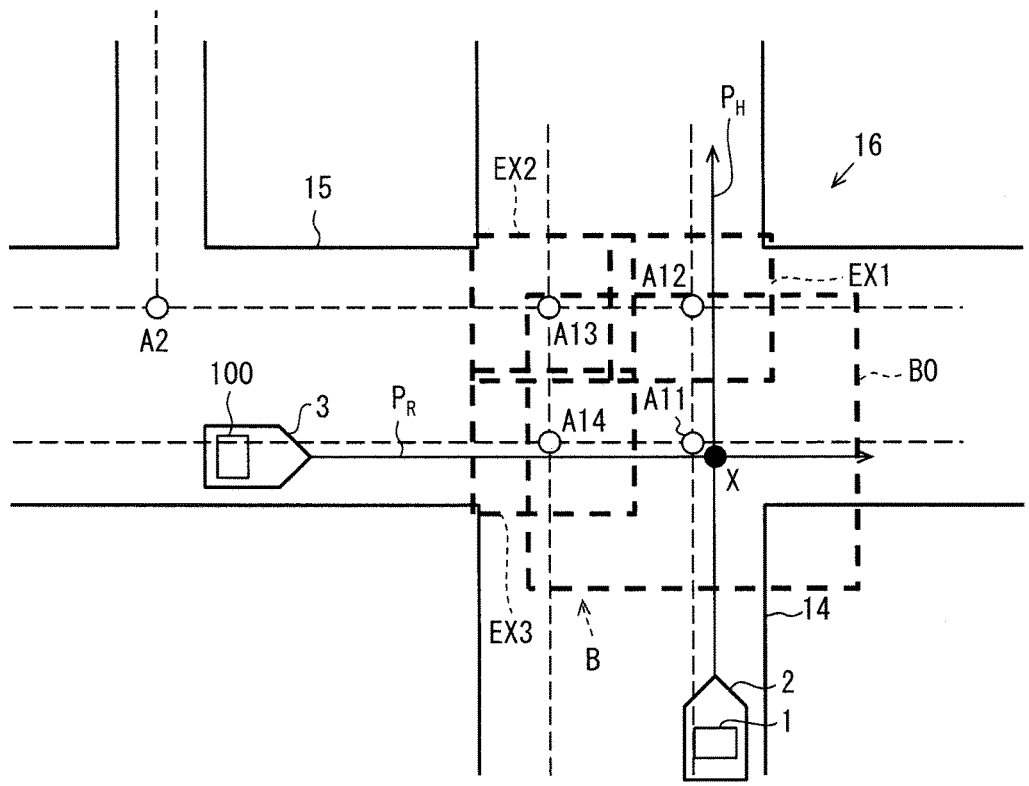
FIG. 10 is an illustration of the D-K-U area that is set by a process of steps in FIG. 9.

In FIG. 10, the same intersection 16 as FIG. 5 is used as an example, and expanded areas EX1, EX2, and EX3 are illustrated.

The expanded areas EX1, EX2, and EX3 are set as an area that centers on the intersection node A12, A13, and A14, respectively.

In S89, the determination-kept-unchanged area B set up in S85 and the expanded areas EX set up in S88 are combined to make a composite area, i.e., to be serving as a new determination-kept-unchanged area B.

In FIG. 10, just like the first embodiment, a numeral B0 is used for indicating the determination-kept-unchanged area set up in S85, for the distinction from the final determination-kept-unchanged area B.

The determination-kept-unchanged area B0 is arranged to be centered on the intersection node A11.

In S89, an area included in at least one of the determination-kept-unchanged area B0 and the expanded areas EX1, EX2, EX3 is set as a new determination-kept-unchanged area B.

Even when the determination-kept-unchanged area B is expanded in the manner described above of the second embodiment, an inside area of the intersection 16 is prevented from spreading/extending out from the determination-kept-unchanged area B. As a result, even when a subject intersection is a large intersection, the determination result regarding a priority road is highly likely kept unchanged until the subject vehicle passes through the subject intersection.

Thereby, even when the subject intersection is a large intersection, the drive support process of S11 is enabled to accurately determine whether it is currently (i) in a situation in which a drive support should be provided (i.e., should not be suppressed) or (ii) in a situation in which a drive support should rather be suppressed based on the determination result of a priority road determination.

Further, in the second embodiment, the final determination-kept-unchanged area B is defined as an area that has an expansion around each of the another intersection nodes relative to the area B0, thereby, in comparison to the area B set in S87 of the first embodiment, having a smaller "outside-intersection area" or a smaller "non-intersection area", i.e., an area "protruding from an actual intersection area", which realized a smaller "surplus" area in which the determination result needs not be kept unchanged.

As mentioned above, although the embodiments of the present disclosure are described, the present disclosure is not necessarily limited to the above-mentioned embodiments, i.e., the following modifications also pertain to the technical scope of the present disclosure. Further, the modifications and variations of the present disclosure need not be limited to the following.

<Modification 1>

According to the above-mentioned embodiments, the travel road determiner 50 performs the map matching based on the current position of the subject vehicle 2, for identifying a road that is traveled by the subject vehicle 2.

However, the road map information around the subject vehicle 2 may be obtained from the travel road determiner 50 based on the current position of the subject vehicle 2, and the controller 13 may perform the map matching based on such information.

Further, the drive support apparatus 10 may be provided with a memory that memorizes the road map information, and the controller 13 may obtain the road map information near the subject vehicle 2 from such a memory.

<Modification 2>

Although a process for expanding the determination-kept-unchanged area B set up in S85 is used in the first and second embodiments, it is not necessary to have such an area expanding process that expands the determination-kept-unchanged area B.

<Modification 3>

According to the above-mentioned embodiments, the subject vehicle predicted path $P_H$ is determined in S3 based on a travel direction of the subject vehicle 2, which is defined as a straight line representing the absolute direction in which the subject vehicle 2 is facing/oriented.

However, a travel direction of the subject vehicle 2 may be defined as an arc with a turning radius of the subject vehicle 2, which is tangential to a front-rear direction line of the subject vehicle 2 at the current position of the subject vehicle. Note that the front-rear direction line of the subject vehicle 2 is a line representing an absolute direction of the subject vehicle 2. Further, the turning radius of the subject vehicle 2 is calculable by dividing the vehicle speed by the yaw rate.

<Modification 4>

Just like the subject vehicle 2, a travel direction of the nearby vehicle 3 may also be defined as an arc with a turning radius of the nearby vehicle 3, which is tangential to a front-rear direction of the nearby vehicle 3 at the current position of the nearby vehicle 3.

<Modification 5>

The drive support system 100 provided in the nearby vehicle 3 may at least be capable of transmitting the nearby vehicle information mentioned above. Therefore, the drive support system 100 needs not be provided with the travel road determiner 50.

<Modification 6>

Although the determination-kept-unchanged area B is defined as a square shape area in the above-mentioned embodiments, the determination-kept-unchanged area B may be defined as a circular area.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive support apparatus for use in a subject vehicle and configured to control a drive support control of the subject vehicle, the drive support apparatus comprising:

a controller including
  a subject vehicle positioner configured to determine a current position of the subject vehicle by receiving a navigation signal from a navigation satellite;
  a road determiner configured to determine a currently-traveled road of the subject vehicle by matching the current position of the subject vehicle to road map information, the road map information representing a road as one or more links with each link having link information and representing an intersection as one or more intersection nodes with each node having node information;
  a node determiner configured to determine a first intersection node on the currently-traveled road, the first intersection node representing a first intersection including at least the currently traveled road and an intersecting road;
  an area setter configured to determine a closed-shaped determination-kept-unchanged (D-K-U) area around the first intersection node;
  a priority determiner configured to determine a priority of the currently-traveled road at the first intersection node before the subject vehicle enters the D-K-U area, the priority determined as either a priority road or a non-priority road; and
  a drive support controller configured to control the drive support control of the subject vehicle in the D-K-U area based on the priority of the currently-traveled road, wherein
the currently traveled road is represented as a first road link by the map information and the intersecting road is represented as a second road link by the map information, and wherein
the D-K-U area surrounds the first intersection node and includes a portion of the first road link and the second road link within the D-K-U area, and wherein
when the subject vehicle enters the D-K-U area, the priority determiner maintains the priority of the currently-traveled road determined before the subject vehicle enters the D-K-U area, and wherein
when the priority of the currently-traveled road is determined as the priority road, the drive support controller suppresses the drive support control when the subject vehicle is in the D-K-U area, and wherein
when the priority of the currently-traveled road is determined as the non-priority road, the drive support controller performs the drive support control when the subject vehicle is in the D-K-U area.

2. The drive support apparatus of claim 1, wherein
the link information for the currently-traveled road includes a number of lanes, and wherein
the link information for the intersecting road includes a number of lanes, and wherein
the area setter determines a size of the D-K-U area around the first intersection node based on the number of lanes of the currently-traveled road and the number of lanes of the intersecting road.

3. The drive support apparatus of claim 2, wherein the D-K-U area is a polygon-shaped area having at least 4 sides, and wherein
a length of a side of the polygon-shaped D-K-U area corresponding to the currently-traveled road is based on the number of lanes of the currently-traveled road, and wherein
a length of a side of the polygon-shaped D-K-U area corresponding to the intersecting road is based on the number of lanes of the intersecting road, and wherein an increase in the number of lanes increases the length of the side.

4. The drive support apparatus of claim 1 further comprising:
an area expander configured to expand the D K-U area when the first intersection is represented by the first intersection node and one or more additional intersection nodes, wherein the expanded D-K-U area surrounds the first intersection node and the one or more additional intersection nodes, and wherein
the priority determiner determines the priority of the currently-traveled road based on the expanded D-K-U area.

5. The drive support apparatus of claim 1 further comprising:
an area expander configured to define an expanded area based on one or more additional intersection nodes when the D-K-U area surrounds the first intersection node and the one or more additional intersection nodes and configured to set a new D-K-U area by combining the expanded area and the D-K-U area set by the area setter, wherein
the priority determiner determines the priority of the currently traveled road based on the new D-K-U area set by the area expander.

6. The drive support apparatus of claim 1, wherein the priority determiner determines the priority of the currently-traveled road by comparing the link information of the currently-traveled road to the link information of the intersecting road.

7. The drive support apparatus of claim 1, wherein the drive support control includes a visual alert that another vehicle on a road other than the currently-traveled road has a right of way at the first intersection.

8. The drive support apparatus of claim 1, wherein the drive support control includes an audio alert that another vehicle on a road other than the currently-traveled road has a right of way at the first intersection.

9. The drive support apparatus of claim 1, wherein the D-K-U area is a polygon-shaped area.

10. The drive support apparatus of claim 1, wherein the D-K-U area is a circular-shaped area.

11. A drive support apparatus disposed in a subject vehicle, comprising:
a Global Navigation Satellite System (GNSS) receiver configured to receive a navigation signal transmitted from navigation satellites;
a communication device configured to communicate with one of another vehicle or a roadside device; and
a controller configured to communicate with the GNSS receiver and the communication device, the controller including
a subject vehicle positioner configured to determine a current position of the based on the navigation signal;
a road determiner configured to determine a currently-traveled road of the subject vehicle by matching the current position of the subject vehicle to road map information, the road map information representing a road as one or more links with each link having link information and representing an intersection as one or more intersection nodes with each node having node information;
a node determiner configured to determine a first intersection node on the currently-traveled road, the first intersection node representing a first intersection including at least the currently traveled road and an intersecting road;
an area setter configured to determine a closed-shaped determination-kept-unchanged (D-K-U) area around the first intersection node;
a priority determiner configured to determine a priority of the currently-traveled road at the first intersection node before the subject vehicle enters the D-K-U area, the priority determined as either a priority road or a non-priority road; and
a drive support controller configured to control the drive support control of the subject vehicle in the D-K-U area based on the priority of the currently-traveled road, wherein
the currently-traveled road is represented as a first road link by the map information and the intersecting road is represented as a second road link by the map information, and wherein
the D-K-U area surrounds the first intersection node and includes a portion of the first road link and the second road link within the D-K-U area, and wherein
when the subject vehicle enters the D-K-U area, the priority determiner maintains the priority of the currently-traveled road determined before the subject vehicle enters the D-K-U area, and wherein
when the priority of the currently-traveled road is determined as the priority road, the drive support controller suppresses the drive support control when the subject vehicle is in the D-K-U area, and wherein
when the priority of the currently-traveled road is determined as the non-priority road, the drive support controller performs the drive support control when the subject vehicle is in the D-K-U area.

12. A drive support system, comprising:
a sensor configured to detect parameters of a subject vehicle;
a travel road determiner configured to provide road map information;
a drive support apparatus configured to receive the detected parameters from the sensor and the road map information from the travel road determiner, the drive support apparatus including:
a Global Navigation Satellite System (GNSS) receiver configured to receive a navigation signal transmitted from navigation satellites;
a communication device configured to communicate with one of another vehicle or a roadside device; and
a controller configured to communicate with the GNSS receiver and the communication device, the controller including
a subject vehicle positioner configured to determine a current position of the based on the navigation signal;
a road determiner configured to determine a currently-traveled road of the subject vehicle by matching the current position of the subject vehicle to the road map information, the road map information representing a road as one or more links with each link having link information and representing an intersection as one or more intersection nodes with each node having node information;
a node determiner configured to determine a first intersection node on the currently-traveled road, the first intersection node representing a first intersection including at least the currently traveled road and an intersecting road;

an area setter configured to determine a closed-shaped determination-kept-unchanged (D-K-U) area around the first intersection node;

a priority determiner configured to determine a priority of the currently-traveled road at the first intersection node before the subject vehicle enters the D-K-U area, the priority determined as either a priority road or a non-priority road; and a drive support controller configured to control the drive support control of the subject vehicle in the D-K-U area based on the priority of the currently-traveled road, wherein the currently-traveled road is represented as a first road link by the map information and the intersecting road is represented as a second road link by the map information, and wherein the D-K-U area surrounds the first intersection node and includes a portion of the first road link and the second road link within the D-K-U area, and wherein when the subject vehicle enters the D-K-U area, the priority determiner maintains the priority of the currently-traveled road determined before the subject vehicle enters the D-K-U area, and wherein when the priority of the currently-traveled road is determined as the priority road, the drive support controller suppresses the drive support control when the subject vehicle is in the D-K-U area, and wherein when the priority of the currently-traveled road is determined as the non-priority road, the drive support controller performs the drive support control when the subject vehicle is in the D-K-U area.

* * * * *